US011830312B2

(12) United States Patent
Meador et al.

(10) Patent No.: US 11,830,312 B2
(45) Date of Patent: Nov. 28, 2023

(54) TRANSPARENT CUBBY SYSTEM FOR AUTONOMOUS DELIVERY SERVICES

(71) Applicant: GM Cruise Holdings LLC, San Francisco, CA (US)

(72) Inventors: Timothy Jon Meador, Fairfield, CA (US); Alexis De Stasio, San Francisco, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 511 days.

(21) Appl. No.: 17/184,897

(22) Filed: Feb. 25, 2021

(65) Prior Publication Data

US 2022/0266738 A1 Aug. 25, 2022

(51) Int. Cl.
*G07F 17/12* (2006.01)
*E05B 49/00* (2006.01)
(Continued)

(52) U.S. Cl.
CPC .............. *G07F 17/12* (2013.01); *E05B 49/00* (2013.01); *E05B 65/0075* (2013.01); *G01C 21/26* (2013.01); *G05D 1/0246* (2013.01); *G05D 1/0274* (2013.01); *G05D 1/0297* (2013.01); *G06Q 20/18* (2013.01); *G06Q 20/3224* (2013.01); *G06Q 20/4014* (2013.01); *G07F 11/62* (2013.01); *G07F 17/0064* (2013.01); *G05D 2201/0213* (2013.01)

(58) Field of Classification Search
CPC ...... G07F 17/12; G07F 11/62; G07F 17/0064; E05B 49/00; E05B 65/0075; G01C 21/26; G05D 1/0246; G05D 1/0274; G05D 1/0297; G05D 2201/0213; G06Q 20/18; G06Q 20/3224; G06Q 20/4014
See application file for complete search history.

(56) References Cited

U.S. PATENT DOCUMENTS 9,489,490 B1 * 11/2016 Theobald ................ G16H 20/13
9,741,010 B1 * 8/2017 Heinla ................... G06Q 10/083
(Continued)

FOREIGN PATENT DOCUMENTS

WO 2017035543 A1 3/2017
WO 2019023704 A1 1/2019

OTHER PUBLICATIONS

PCT International Search Report and Written Opinion issued in PCT/US2021/048162 dated Jan. 3, 2022; 11 pages.

*Primary Examiner* — Hussein Elchanti
(74) *Attorney, Agent, or Firm* — Akona IP PC

(57) ABSTRACT

An autonomous delivery system for a vehicle is described and includes a plurality of cubbies for retaining items for delivery to users, wherein each of the cubbies comprises a door for selectively enabling access to contents of the cubby, wherein each of the doors comprises a selectively transparent display and wherein upon arrival at a delivery destination, the selectively transparent displays communicate to a recipient associated with the delivery destination in which one of the cubbies a delivery associated with the recipient is retained; and an authentication system for authenticating the recipient and, subsequent to successful authentication of the recipient, permitting access to contents of the one of the cubbies in which the delivery associated with the recipient is retained.

20 Claims, 12 Drawing Sheets

(51) Int. Cl.
*E05B 65/00* (2006.01)
*G07F 11/62* (2006.01)
*G01C 21/26* (2006.01)
*G05D 1/02* (2020.01)
*G06Q 20/18* (2012.01)
*G06Q 20/32* (2012.01)
*G06Q 20/40* (2012.01)
*G07F 17/00* (2006.01)

(56) References Cited

U.S. PATENT DOCUMENTS

| | | | | |
|---|---|---|---|---|
| 2008/0149658 | A1* | 6/2008 | Hudis | G07F 9/02 221/1 |
| 2013/0103605 | A1* | 4/2013 | Villegas | G06Q 10/06 705/332 |
| 2014/0330603 | A1* | 11/2014 | Corder | G05B 15/02 705/7.12 |
| 2015/0228253 | A1* | 8/2015 | Lee | G06V 20/20 345/592 |
| 2017/0282365 | A1* | 10/2017 | Erhart | G06F 21/74 |
| 2017/0301173 | A1* | 10/2017 | Hindsgaul | G06F 18/00 |
| 2018/0029083 | A1* | 2/2018 | Farlotti | G06V 30/40 |
| 2018/0205682 | A1* | 7/2018 | O'Brien, V | H04L 51/046 |
| 2018/0246526 | A1* | 8/2018 | Wilkinson | G08B 21/182 |
| 2018/0349834 | A1* | 12/2018 | Heinla | G06Q 50/28 |
| 2019/0236520 | A1* | 8/2019 | Kaneko | B60P 1/6418 |
| 2019/0287051 | A1* | 9/2019 | Heinla | G06Q 50/28 |
| 2020/0050978 | A1* | 2/2020 | Perez Barrera | G06Q 30/0241 |
| 2020/0230822 | A1* | 7/2020 | Sohmshetty | B25J 11/008 |
| 2021/0094506 | A1* | 4/2021 | Baker | G06Q 50/28 |
| 2023/0009543 | A1* | 1/2023 | Liivik | B25J 11/008 |
| 2023/0278555 | A1* | 9/2023 | Kim | G01C 21/36 701/41 |

* cited by examiner

TRANSPARENT CUBBY SYSTEM FOR AUTONOMOUS DELIVERY SERVICES

TECHNICAL FIELD OF THE DISCLOSURE

The present disclosure relates generally to autonomous delivery vehicles and, more specifically, to a transparent cubby system for storing and moving delivery loads within an autonomous vehicle.

BACKGROUND

In a conventional delivery context, a person drives a vehicle with items for delivery to recipients, and the person removes the items for delivery and hand-delivers the items to their recipients. For example, a grocery delivery service may employ people to shop for a customer's groceries, load the groceries into a car, drive the groceries to a delivery address, and deliver the groceries from the car to the customer's doorstep.

Autonomous vehicles (AVs) can be used to deliver various items, such as groceries, to recipients. However, when an AV is used for delivery, there is nobody to assist the recipient with finding the recipient's items or prevent the recipient from accidentally or purposefully taking items requested by another recipient. Existing AVs for grocery delivery have built-in compartments that can store different loads for different customers. However, such AVs are specifically designed for grocery delivery, and they cannot be repurposed for other applications, such as ridesharing.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

Figure 1:
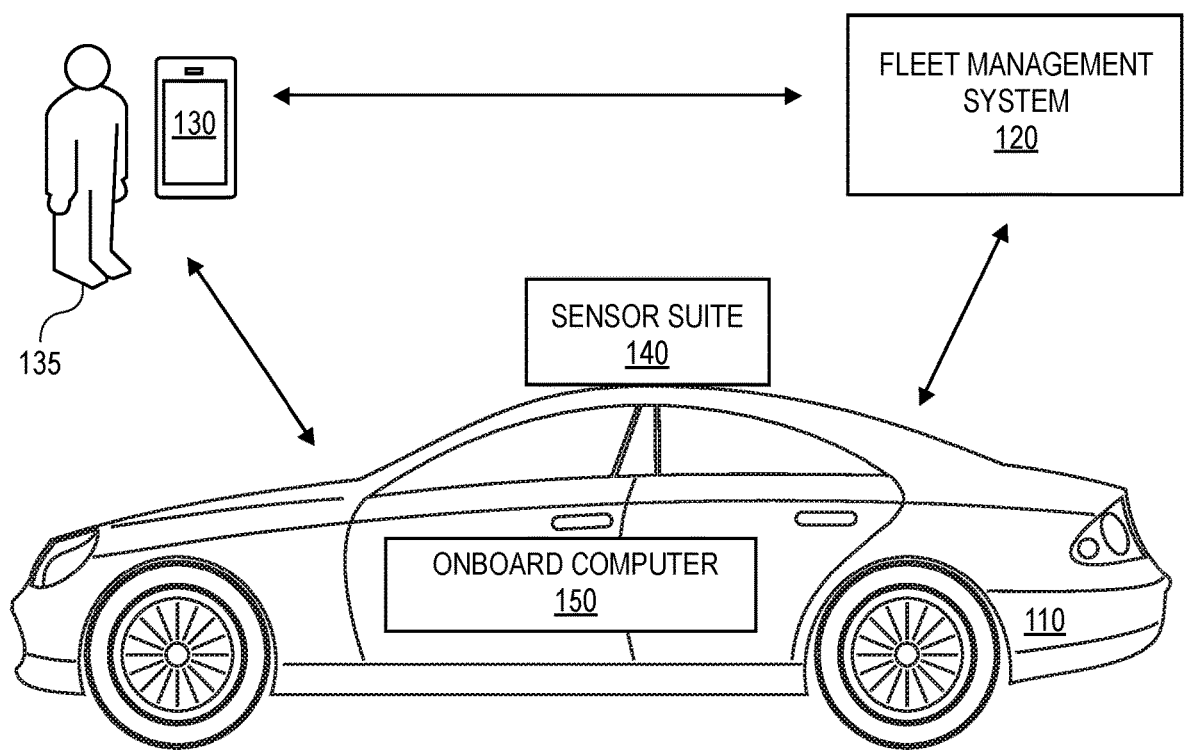
FIG. 1 is a block diagram illustrating an environment including an AV that can be used to deliver items to a user according to some embodiments of the present disclosure.

The systems, methods, and devices of this disclosure each have several innovative aspects, no single one of which is solely responsible for all of the desirable attributes disclosed herein. Details of one or more implementations of the subject matter described in this specification are set forth in the description below and the accompanying drawings.

Delivery vehicles often carry loads for multiple recipients simultaneously. For example, a vehicle used to delivery groceries receives multiple loads of groceries at a grocery store, and the vehicle drops off the loads of groceries to their respective recipients without returning to the grocery store. When the vehicle is operated by a human driver, the driver typically ensures that each recipient receives the correct grocery load. However, when an AV is used to delivery groceries, there is no human operator to ensure that the grocery loads go to the correct recipients.

As described herein, an AV is equipped with a transparent cubby system that can hold multiple items intended for different recipients, such as multiple bags of groceries. Each item (or a bag of items) may be placed within one of the transparent cubbies of the transparent cubby system described herein. As the AV goes from recipient to recipient, the transparent cubby system communicates to the recipient the cubby or cubbies in which the recipient's items are located using selectively transparent touchscreen displays integrated into the doors of the cubbies. Once the recipient has been authenticated, the door(s) of the appropriate cubby or cubbies are opened and the recipient is able to retrieve their items from the cubby or cubbies. The recipient can thus access the items intended for that recipient, while the other items are not accessible. This ensures that recipients can easily access the item or items intended for them, and that items are not accidentally or maliciously accessed by unintended recipients.

The transparent cubby system described herein can be installed in an AV that can be alternately configured to provide passenger services and delivery services. For example, the AV may have a main cabin with passenger seating, e.g., two rows of seats that face each other. The transparent cubby system may be installed within the main cabin while leaving the seats in place. While the transparent cubby system is installed, the AV may be used solely for delivery services. The transparent cubby system can be removed so that the AV can resume passenger services. This allows the AV to be repurposed based on fluctuating consumer demand or other factors.

Embodiments of the present disclosure provide an autonomous delivery system for a vehicle including a plurality of cubbies for retaining items for delivery to users, wherein each of the cubbies comprises a door for selectively enabling access to contents of the cubby, wherein each of the doors comprises a selectively transparent display, which in some embodiments may be implemented as a liquid crystal display (LCD), and wherein upon arrival at a delivery destination, the selectively transparent displays communicate to a recipient associated with the delivery destination in which one of the cubbies a delivery associated with the recipient is retained; and an authentication system for authenticating the recipient and, subsequent to successful authentication of the recipient, permitting access to contents of the one of the cubbies in which the delivery associated with the recipient is retained.

Embodiments further include an autonomous delivery system comprising a plurality of cubbies disposed within an autonomous vehicle (AV), the cubbies for retaining items for delivery to users, wherein each of the cubbies comprises a door for selectively enabling access to contents of the cubby, wherein each of the doors comprises a transparent touchscreen display, which in some embodiments may be implemented as a liquid crystal display (LCD); a system for using the displays to communicate to a recipient associated with the delivery destination in which one of the cubbies a delivery associated with the recipient is retained; and an authentication system for authenticating the recipient and, subsequent to successful authentication of the recipient, opening the door of the one of the cubbies in which the delivery associated with the recipient is retained, wherein the authentication system comprises a keypad selectively displayed on the display of the one of the cubbies in which the delivery associated with the recipient is retained for use by the recipient to enter a passcode.

Embodiments further include an autonomous delivery system method comprising receiving in one of a plurality of cubbies arranged in an autonomous vehicle (AV) an item for transportation to a recipient at a delivery destination, wherein each of the cubbies includes a door for selectively enabling access to contents of the cubby, wherein each of the doors comprises a selectively transparent display, which in some embodiments may be implemented as a liquid crystal display (LCD); navigating the AV to the delivery destination; subsequent to arrival at the delivery destination, identifying to the recipient using the selectively transparent displays of the one of the cubbies in which the delivery is located; authenticating the recipient using a passcode provided by the recipient; and subsequent to successful authentication of the recipient, permitting access to the delivery via the door of the one of the cubbies.

As will be appreciated by one skilled in the art, aspects of the present disclosure, in particular aspects of conveyor systems for AVs, described herein, may be embodied in various manners (e.g., as a method, a system, an AV, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings, in which like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Other features and advantages of the disclosure will be apparent from the following description and the claims.

Example Environment for AV Delivery

FIG. 1 is a block diagram illustrating an environment including an AV that can be used to deliver items to a user according to some embodiments of the present disclosure. The environment includes an AV 110, a fleet management system 120, and a user device 130. The AV 110 may include a sensor suite 140 and an onboard computer 150. The fleet management system 120 may manage a fleet of AVs that are similar to AV 110; the other AVs in the fleet may also include a sensor suite and onboard computer. The fleet management system 120 may receive service requests for the AVs 110 from user devices 130. For example, a user 135 may make a request for delivery of groceries using an application, or app, executing on the user device 130. The user device 130 may transmit the request directly to the fleet management system 120, or the user device 130 may transmit the request to a separate service (e.g., a service provided by a grocery store) that coordinates with the fleet management system 120 to deliver orders to users. The fleet management system 120 dispatches the AVs 110 to carry out the service requests. For example, the fleet management system 120 may instruct the AV 110 to pick up multiple loads of groceries from a grocery store and to deliver the groceries to different users, e.g., one bag of groceries to user 135 at a first location, and another bag of groceries to another user at a second location. An operator places each bag of groceries for delivery into a cubby of the transparent cubby system within the AV 110. The onboard computer 150 may keep track of the bags' location within the transparent cubby system the AV 110. When the AV 110 arrives at a particular delivery location (e.g., the first location of the user 135), the user is notified which cubby or cubbies contain the user's item(s) and the user is granted access to the cubby/cubbies to retrieve the item(s).

The AV 110 is preferably a fully autonomous automobile, but may additionally or alternatively be any semi-autonomous or fully autonomous vehicle; e.g., a boat, an unmanned aerial vehicle, a self-driving car, etc. Additionally, or alternatively, the AV 110 may be a vehicle that switches between a semi-autonomous state and a fully autonomous state and thus, the AV may have attributes of both a semi-autonomous vehicle and a fully autonomous vehicle depending on the state of the vehicle.

The AV 110 may include a throttle interface that controls an engine throttle, motor speed (e.g., rotational speed of electric motor), or any other movement-enabling mechanism; a brake interface that controls brakes of the AV (or any other movement-retarding mechanism); and a steering interface that controls steering of the AV (e.g., by changing the angle of wheels of the AV). The AV 110 may additionally or alternatively include interfaces for control of any other vehicle functions, e.g., windshield wipers, headlights, turn indicators, air conditioning, etc.

The AV 110 includes a sensor suite 140, which may include a computer vision ("CV") system, localization sensors, and driving sensors. For example, the sensor suite 140 may include photodetectors, cameras, radar, sonar, lidar, GPS, wheel speed sensors, inertial measurement units (IMUS), accelerometers, microphones, strain gauges, pressure monitors, barometers, thermometers, altimeters, etc. The sensors may be located in various positions in and around the AV 110. For example, the sensor suite 140 may include multiple cameras mounted at different positions on the AV 110, including within the main cabin for passengers and/or deliveries.

An onboard computer 150 may be connected to the sensor suite 140 and functions to control the AV 110 and to process sensed data from the sensor suite 140 and/or other sensors in order to determine the state of the AV 110. Based upon the vehicle state and programmed instructions, the onboard computer 150 modifies or controls behavior of the AV 110. In addition, the onboard computer 150 controls the transparent cubby system and other AV components used in grocery delivery, such as the AV doors.

The onboard computer 150 is preferably a general-purpose computer adapted for I/O communication with vehicle control systems and sensor suite 140 but may additionally or alternatively be any suitable computing device. The onboard computer 150 is preferably connected to the Internet via a wireless connection (e.g., via a cellular data connection). Additionally or alternatively, the onboard computer 150 may be coupled to any number of wireless or wired communication systems. Aspects of the onboard computer 150 are described in greater detail with reference to FIG. 5.

The fleet management system 120 manages the fleet of AVs, including AV 110. The fleet management system 120 may manage one or more services that provide or use the AVs, e.g., a service for providing rides to users with the AVs, or a service that delivers items, such as prepared foods, groceries, or packages, using the AVs. The fleet management system 120 may select an AV from the fleet of AVs to perform a particular service or other task and instruct the selected AV to autonomously drive to a particular location (e.g., a delivery address). The fleet management system 120 may select a route for the AV 110 to follow. The fleet management system 120 may also manage fleet maintenance tasks, such as charging, servicing, and cleaning of the AV. As shown in FIG. 1, the AV 110 communicates with the fleet management system 120. The AV 110 and fleet management system 120 may connect over a public network, such as the Internet. The fleet management system 120 is described in greater detail with reference to FIG. 6.

Example AV with Transparent Cubby System

Figure 2:
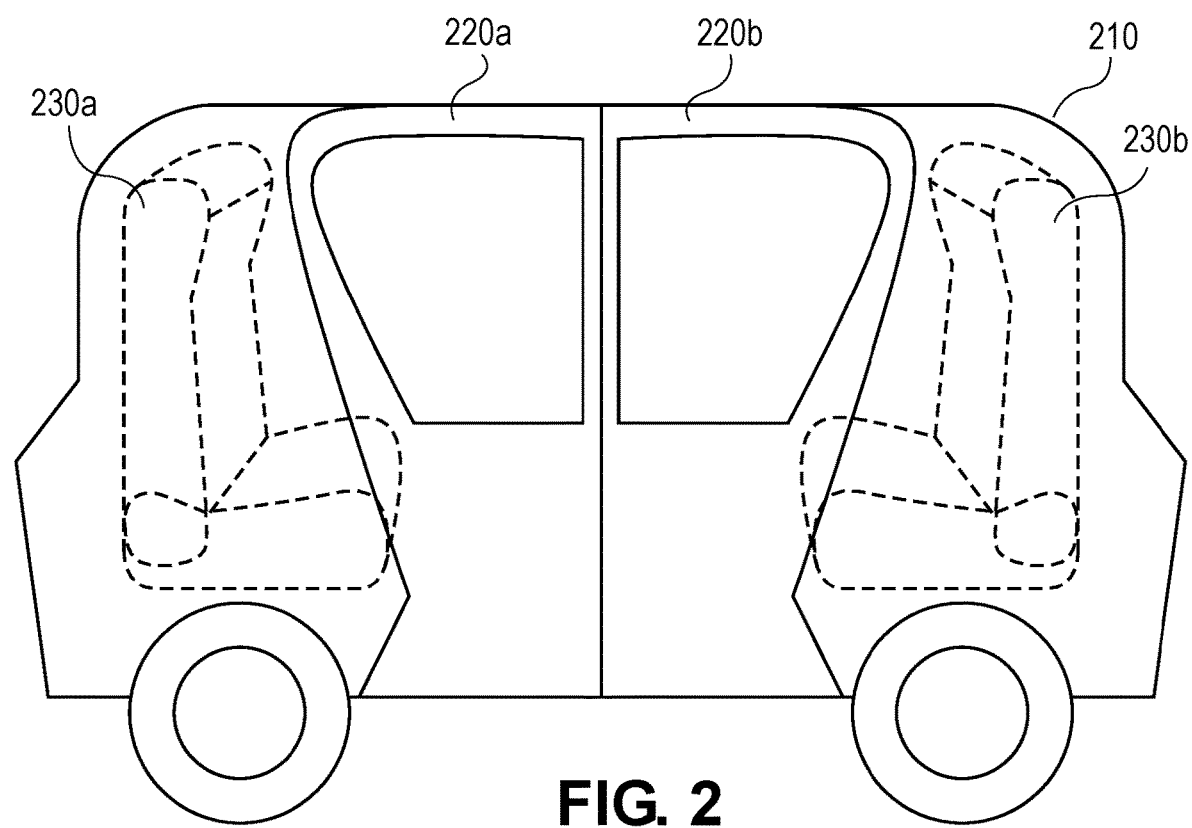
FIG. 2 illustrates an example AV with a main cabin that can be configured for grocery delivery according to some embodiments of the present disclosure.

FIG. 2 illustrates an example AV with a main cabin that can be configured for delivery according to some embodiments of the present disclosure. FIG. 2 shows an AV 210, which is an example of the AV 110 described with respect to FIG. 1. The AV 210 includes two outer doors 220a and 220b along one side of the AV 210. In some embodiments, the AV 210 includes two similar doors on the opposite side of the doors 220a and 220b. The doors 220 provide access to a main cabin of the AV 210. The main cabin may be used for passenger seating. In the embodiment illustrated in FIG. 2, the main cabin includes two rows of seats 230a and 230b. The two rows of seats 230a and 230b are arranged facing each other with a large gap in the middle.

Figure 3A:
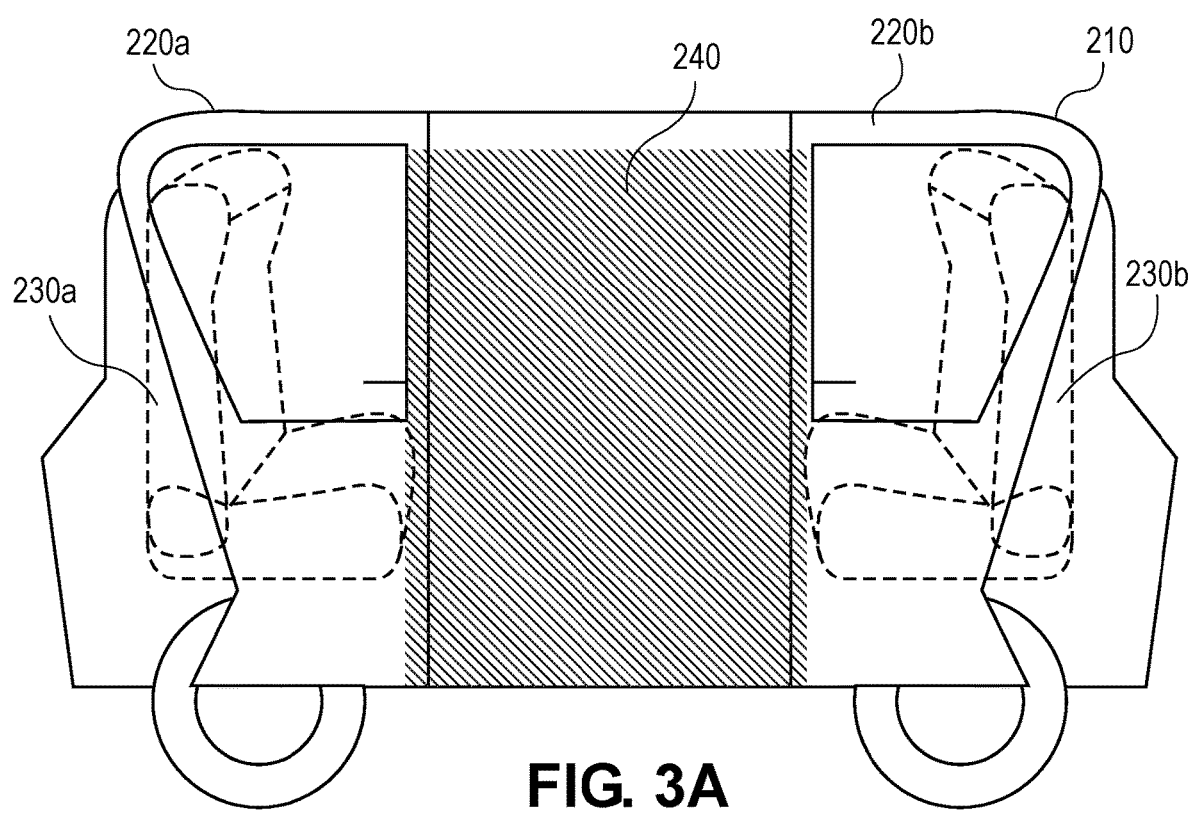
FIG. 3A illustrates the example AV with two of its doors open to the main cabin according to some embodiments of the present disclosure.
Figure 3B:
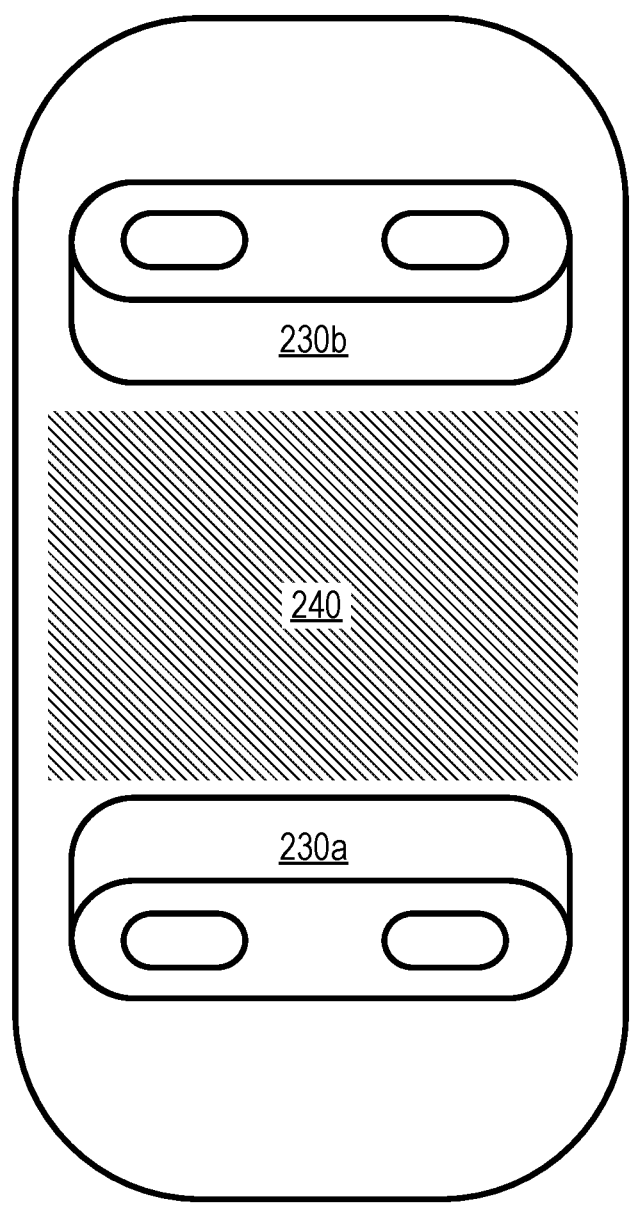
FIG. 3B illustrates an example floor plan of an example AV according to some embodiments of the present disclosure.
Figure 4A:
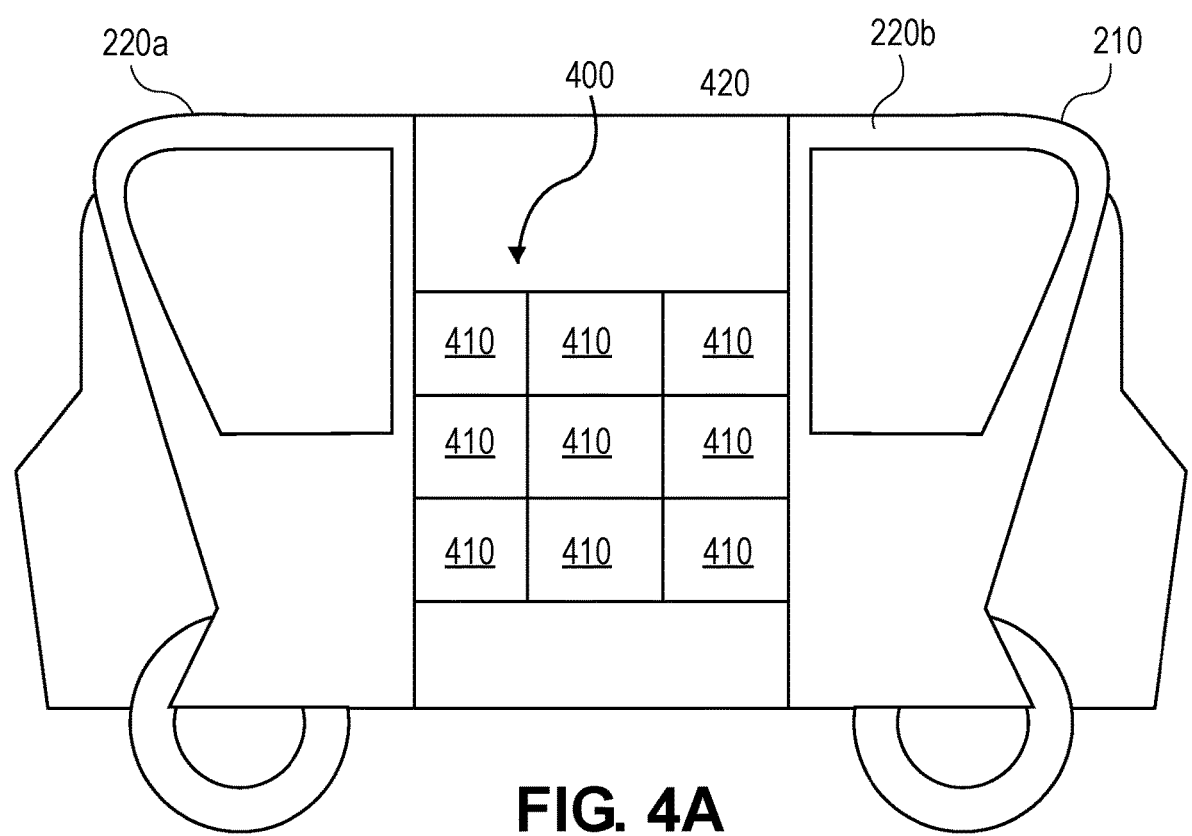
FIG. 4A illustrates the example AV with a transparent cubby system inside its main cabin according to some embodiments of the present disclosure.

To provide access to a main cabin of the AV 210, the left door 220a slides towards the left and the right door 220b slides to the right. FIG. 3A illustrates the AV 210 with its doors 220a and 220b open to allow access to the main cabin. A shaded area 240 between the seats 230a and 230b corresponds to a portion of the main cabin that is available to transport delivery items. The main cabin of the AV 210 includes the passenger seats 230 and the area 240 between the seats. FIG. 3B illustrates an example "floor plan" of the AV 210 showing the area 240 between the seats 230a and 230b. A transparent cubby system can fit into the area 240 as illustrated in FIG. 4A. In alternate embodiments, the AV 210 may have a different configuration, e.g., with seats in different positions, doors in different positions, doors opening in different ways, etc.

Leaving the seats 230a and 230b in the AV 210 when the AV 210 is configured for delivery enables the fleet manager to switch the AV 210 between a passenger mode and a delivery mode more easily. Removing the seats 230a and 230b from the AV 210 may be cumbersome or may not be possible through the opening created by opening the doors 220a and 220b. Furthermore, repeated removal and reinstallation of the seats 230a and 230b may lead to increased wear and reduce their lifespan. In some cases, a fleet manager may cover the seats 230a and 230b with a protective cover while the AV 210 is used for delivery.

FIG. 4A illustrates the example AV 210 with a transparent cubby system 400 installed inside its main cabin according to some embodiments of the present disclosure. The transparent cubby system 400 includes a plurality of cubbies 410 each of which includes a transparent door. In certain embodiments, each door comprises an integrated selectively transparent touchscreen display, which may be implemented as an LCD, for purposes that will be described in greater detail hereinbelow. It will be recognized that although the transparent cubby system 400 is illustrated as including nine (9) cubbies 410, the system may include more or fewer cubbies as appropriate to a given application. Additionally, although the cubbies 410 are illustrated as being identically sized, one or more of the cubbies may be larger or smaller than others as appropriate to a given application. In operation, deliveries, such as groceries, intended for a particular recipient (e.g., in response to an order placed by the recipient) may be loaded into one or more of the cubbies 410 to be retrieved by the recipient upon delivery in a manner to be described in greater detail below. The transparent cubby system 400 may be used for items besides groceries, such as prepared foods, consumer goods, or other items ordered or otherwise requisitioned by a recipient.

In certain embodiments, the temperature of each of the cubbies 410 (or sets of cubbies) may be independently controllable such that a certain one or ones of the cubbies 410 may be maintained at a significantly colder temperature than the remaining cubbies, while a certain one or ones of the cubbies may be maintained at a significantly warmer temperature than the remaining cubbies. The temperature of the cubbies 410 may be static or dynamically adjustable based on the contents thereof.

In certain embodiments, each of the cubbies 410 may include internal lighting to facilitate the user being able to see the items contained therein before and/or after the cubby is opened. In some embodiments, the lighting may be a single color (e.g., white) or programmable to one of a plurality of colors.

In certain embodiments, sensor suite 140 (FIG. 1) may include one or more sensors for detecting whether one or more of the cubbies 410 is "occupied," i.e., contains an item. Such sensors may include one or more of a camera and a weight sensor. Additionally, sensor suite 140 may include one or more readers (e.g., RFID reader, bar code reader, QR code reader) for reading corresponding codes associated with items placed within the cubbies.

In certain embodiments, the displays may be used to alert a user that they have left an item in one of the cubbies. Additionally and/or alternatively, the door of a cubby in which an item has been left is prevented from being closed until the item is removed from the cubby.

As previously noted, each of the cubbies 410 includes a door comprising an integrated selectively transparent touchscreen display, which in certain embodiments is implemented as an LCD. As will be described in greater detail below, the display may provide instructions or information to a user, such as information as to which one(s) of the cubbies 410 contain the user's order and instructions for removing the item(s) from the identified one(s) of the cubbies. In some embodiments, the display is interactive and can receive user input. For example, the display may enable a user to provide identifying or verifying information, such as a name, a passcode, or an order number. In response to verifying the user, the door of the cubby may automatically open so that the user can retrieve the item(s) from the open cubby. The transparent touchscreen display may display text and/or graphics. The transparent touchscreen display may be selectively rendered partially or fully opaque. The transparent touchscreen display may be caused to blink or flash.

Figure 4B:
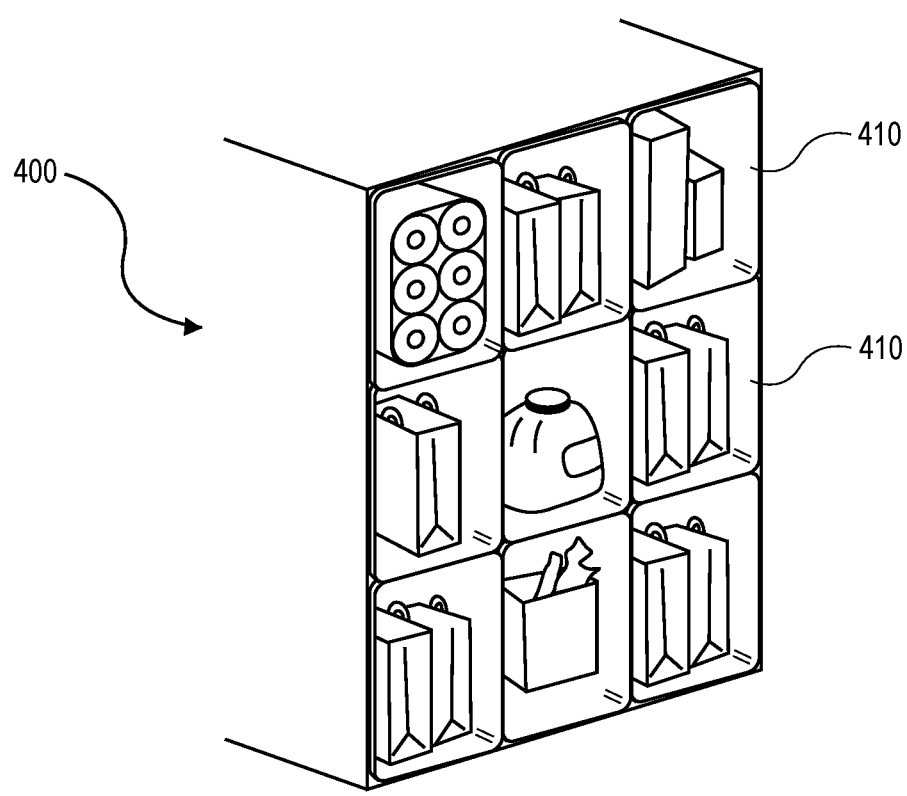
FIGS. 4B-4E illustrate various aspects of the transparent cubby system according to some embodiments of the present disclosure.
Figure 4C:
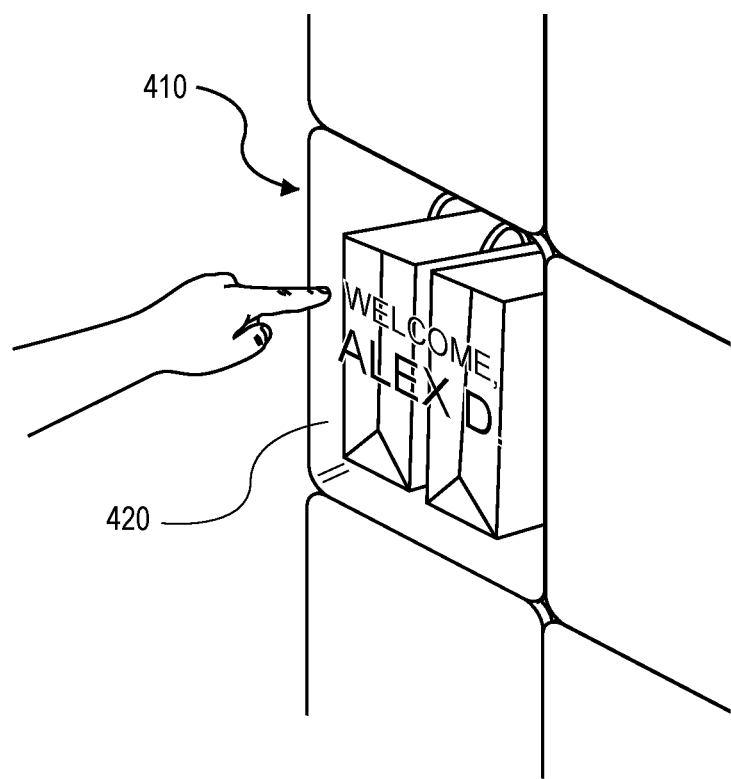

FIGS. 4B-4E illustrate various aspects of the transparent cubby system 400 including cubbies 410 according to some embodiments of the present disclosure. FIG. 4B illustrates a more detailed view of the transparent cubby system 400 showing items disposed within each of the cubbies 410. Referring now to FIG. 4C, as previously noted, in accordance with features of embodiments described herein, each cubby 410 includes a door 420 that includes an integrated touchscreen display, which may be used to communicate instructions and/or information to a user, such as a delivery recipient. As shown in FIG. 4C, the door 420 may be used to communicate text information to a user (e.g., "WELCOME, ALEX D.").

As shown in FIG. 4B, the doors of the cubbies 410 are in a transparent mode such that all of the items are visible therethrough. As will be described in greater detail below, the doors of the cubbies 410 may be made selectively partially or fully opaque such that the items disposed within the corresponding cubbies are partially or fully hidden from view.

Figure 4D:
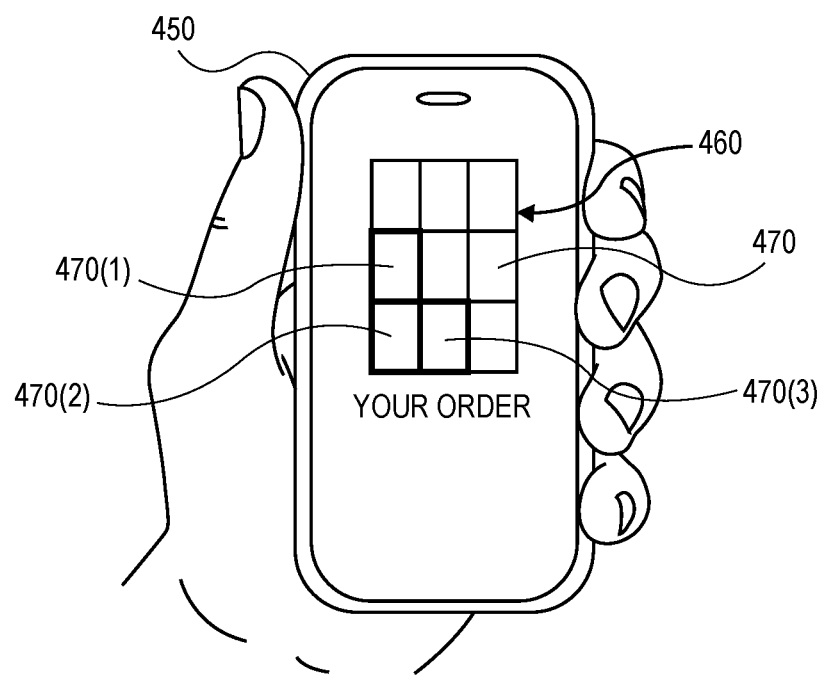
Figure 4E:
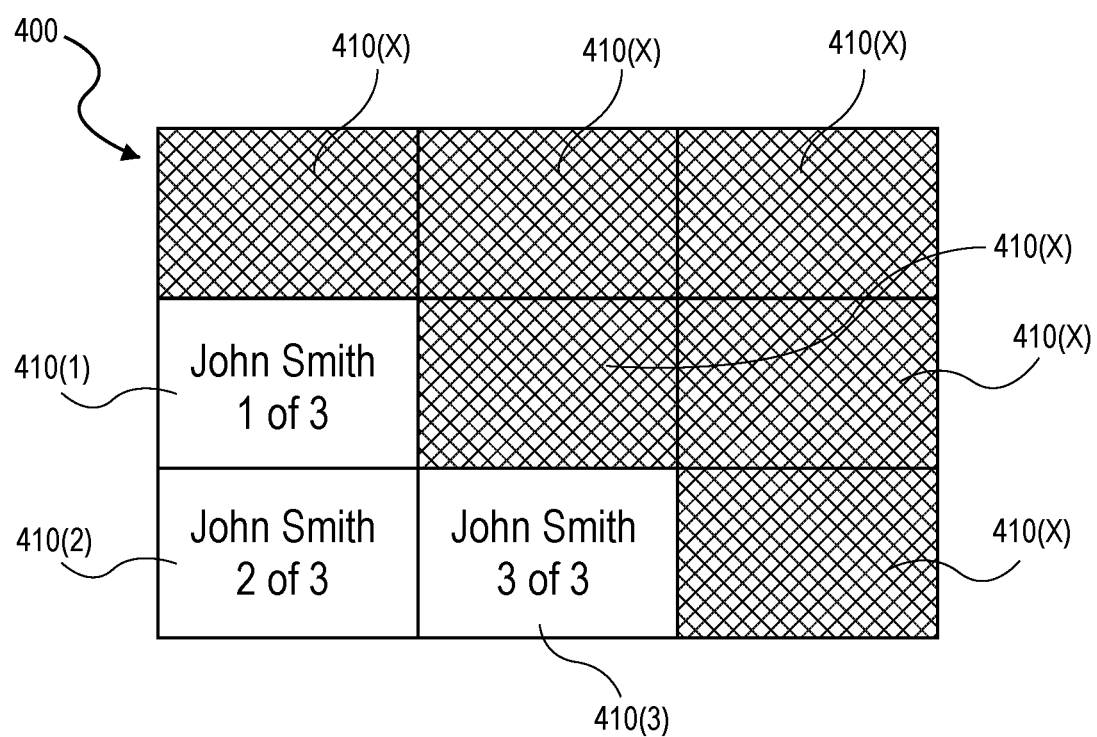

Referring to FIGS. 4D and 4E, a delivery app installed on a user device 450 may interact with the system 400 for communicating to a user in which cubby or cubbies the user's items are located. For example, as shown in FIG. 4D, a user interface 460 displayed on the user device 450 includes a number of boxes 470 each of which corresponds to a cubby 410 of the system 400. As shown in FIGS. 4D and 4E, boxes 470(1)-470(3) are highlighted to indicate that the user's items are contained within corresponding cubbies 410(1)-410(3). Additionally, as shown in FIG. 4E, the doors of cubbies 410(1)-410(3) have displayed thereon a text message for communicating to the user (e.g., "John Smith") that their items are contained within those cubbies. In the illustrated embodiment, doors of remaining cubbies 410(X) are darkened or otherwise rendered opaque so that the present user cannot see the items contained within those cubbies and also to further direct the user's attention to the cubbies 410(1)-410(3).

Example Onboard Computer

Figure 5:
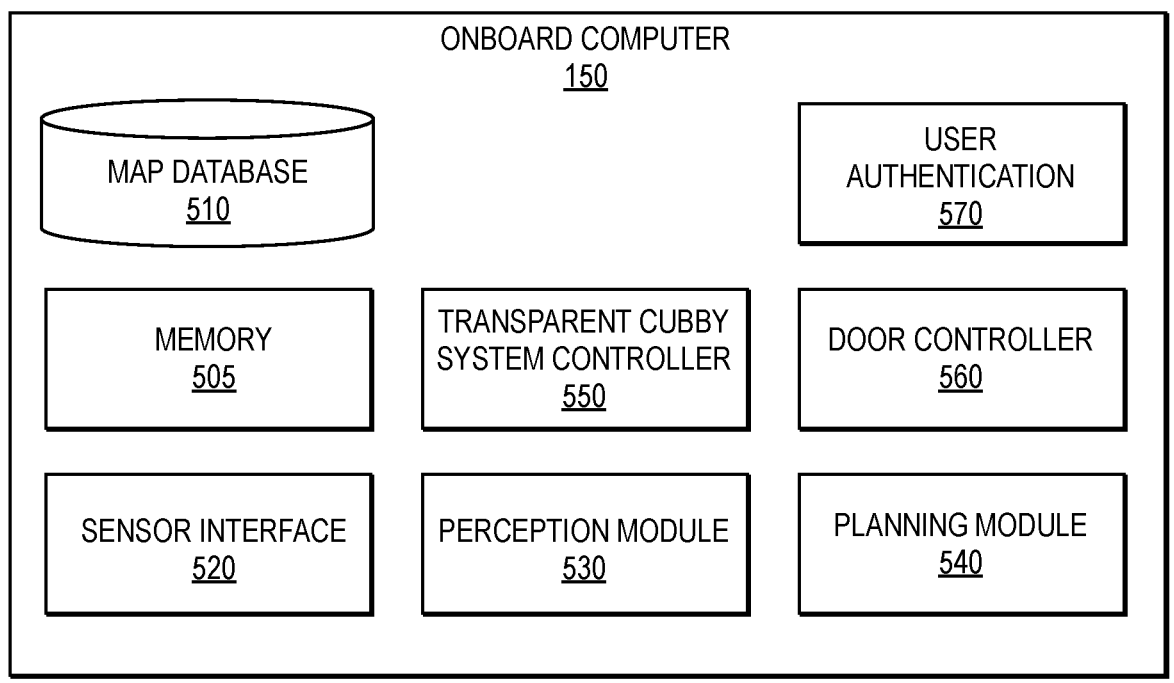
FIG. 5 is a block diagram illustrating an onboard computer for enabling delivery according to some embodiments of the present disclosure.

FIG. 5 is a block diagram illustrating an onboard computer 150 for enabling delivery according to some embodiments of the present disclosure. The onboard computer 150 may include memory 505, a map database 510, a sensor interface 520, a perception module 530, a planning module 540, a transparent cubby system controller 550, a door controller 560, and a user authentication module 570. In alternative configurations, fewer, different and/or additional components may be included in the onboard computer 150. For example, components and modules for controlling movements of the AV 110 and other vehicle functions, and components and modules for communicating with other systems, such as the fleet management system 120, are not shown in FIG. 5. Further, functionality attributed to one component of the onboard computer 150 may be accomplished by a different component included in the onboard computer 150 or a different system from those illustrated.

The map database 510 stores a detailed map that includes a current environment of the AV 110. The map database 510 includes data describing roadways (e.g., locations of roadways, connections between roadways, roadway names, speed limits, traffic flow regulations, toll information, etc.) and data describing buildings (e.g., locations of buildings, building geometry, building types). The map database 510 may further include data describing other features, such as bike lanes, sidewalks, crosswalks, traffic lights, parking lots, etc.

The sensor interface 520 interfaces with the sensors in the sensor suite 140. The sensor interface 520 may request data from the sensor suite 140, e.g., by requesting that a sensor capture data in a particular direction or at a particular time.

The sensor interface 520 is configured to receive data captured by sensors of the sensor suite 140. The sensor interface 520 may have subcomponents for interfacing with individual sensors or groups of sensors of the sensor suite 140, such as a thermal sensor interface, a camera interface, a lidar interface, a radar interface, a microphone interface, etc.

The perception module 530 identifies objects in the environment of the AV 110. The sensor suite 140 produces a data set that is processed by the perception module 530 to detect other cars, pedestrians, trees, bicycles, and objects traveling on or near a road on which the AV 110 is traveling or stopped, and indications surrounding the AV 110 (such as construction signs, traffic cones, traffic lights, stop indicators, and other street signs). For example, the data set from the sensor suite 140 may include images obtained by cameras, point clouds obtained by lidar (light detecting and ranging) sensors, and data collected by radar sensors. The perception module 530 may include one or more classifiers trained using machine learning to identify particular objects. For example, a multi-class classifier may be used to classify each object in the environment of the AV 110 as one of a set of potential objects, e.g., a vehicle, a pedestrian, or a cyclist. As another example, a human classifier recognizes humans in the environment of the AV 110, a vehicle classifier recognizes vehicles in the environment of the AV 110, etc.

The planning module 540 plans maneuvers for the AV 110 based on map data retrieved from the map database 510, data received from the perception module 530, and navigation information, e.g., a route instructed by the fleet management system 120. In some embodiments, the planning module 540 receives map data from the map database 510 describing known, relatively fixed features and objects in the environment of the AV 110. For example, the map data includes data describing roads as well as buildings, bus stations, trees, fences, sidewalks, etc. The planning module 540 receives data from the perception module 530 describing at least some of the features described by the map data in the environment of the AV 110. The planning module 540 determines a pathway for the AV 110 to follow. The pathway includes locations for the AV 110 to maneuver to, and timing and/or speed of the AV 110 in maneuvering to the locations.

The transparent cubby system controller 550 controls various aspects of the transparent cubby system 400, including but not limited to communicating with users via integrated displays of the cubbies 410 and selectively enabling users to access one or more cubbies 410. The transparent cubby system controller 550 may control the integrated displays of the cubbies 410 to communicate to a user which cubby or cubbies contain the user's item(s), as described in detail below. Additionally, the transparent cubby system controller 550 may control locks associated with doors to one or more of the cubbies 410 of the system 400. In some embodiments, one or more cubby doors of the system 400 may have automated opening mechanisms, and the transparent cubby system controller 550 instructs an automated opening mechanism to open the door automatically.

The door controller 560 selectively enables access to the main cabin of the AV, such as AV 210 (FIGS. 2 and 3A), via doors, such as doors 220a, 220b (FIGS. 2 and 3A). The door controller 560 may control locks associated with main cabin access doors. In some embodiments, one or more main cabin access doors may have automated opening mechanisms, and the door controller 560 instructs an automated opening mechanism to open one or more of the doors automatically. In some embodiments, the door controller 560 may instruct the automated door opening mechanism to open one or more of the doors in response to authenticating a user.

The user authentication module 570 performs authentication procedures in response to a user entering a passcode using a keypad or other entry device designed for that purpose. The passcode may be one that has been previously selected by the user for the delivery system or may have been provided to the user for one time use in connection with the order. Once the user's identity has been authenticated, the door controller 560 may instruct an automated door opening mechanism to open the door(s) of the cubby or cubbies in which the user's items are stored are opened, allowing the user to access their item(s).

Example Fleet Management System

Figure 6:
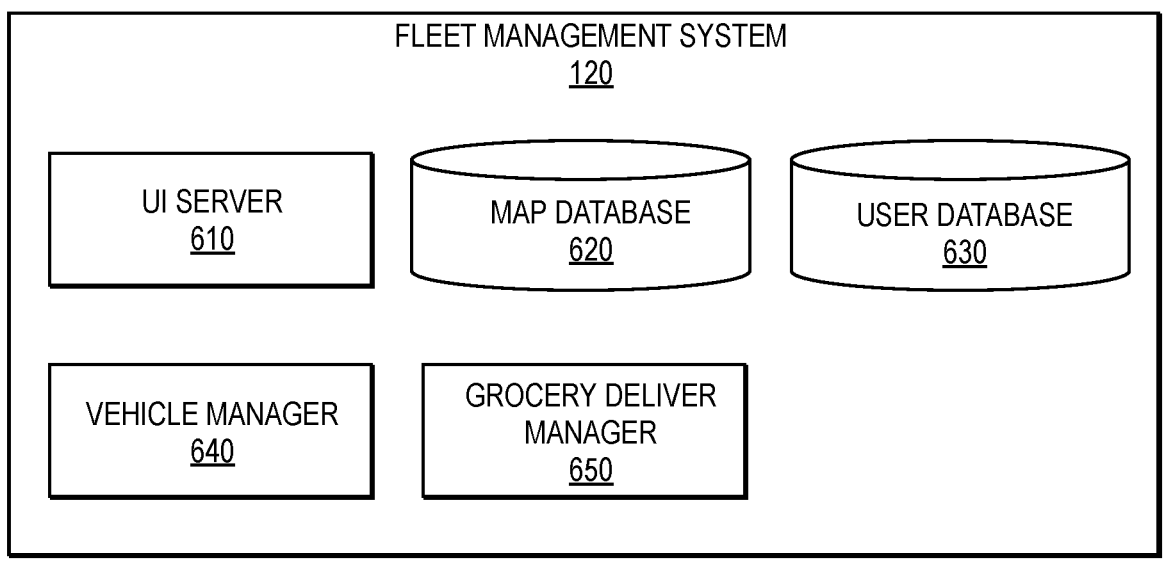
FIG. 6 is a block diagram of a fleet management system according to some embodiments of the present disclosure.

FIG. 6 is a block diagram illustrating the fleet management system 120 according to some embodiments of the present disclosure. The fleet management system 120 includes a UI (user interface) server 610, a map database 620, a user database 630, a vehicle manager 640, and a grocery delivery manager 650. In alternative configurations, different, additional, or fewer components may be included in the fleet management system 120. Further, functionality attributed to one component of the fleet management system 120 may be accomplished by a different component included in the fleet management system 120 or a different system than those illustrated.

The UI server 610 is configured to communicate with client devices that provide a user interface to users. For example, the UI server 610 may be a web server that provides a browser-based application to client devices, or the UI server 610 may be a mobile app server that interfaces with a mobile app installed on client devices, such as the user device 130. The user interface enables the user to access a service of the fleet management system 120, e.g., to request a ride from an AV 110, or to request a delivery from an AV 110. For example, the UI server 610 receives a request for a ride that includes an origin location (e.g., the user's current location) and a destination location, or a request for a delivery that includes a pickup location (e.g., a local restaurant) and a destination location (e.g., the user's home address). In accordance with features of embodiments described herein, UI server 610 may communicate information to a user regarding the cubby or cubbies 410 contain the user's delivery.

The map database 620 stores a detailed map describing roads and other areas (e.g., parking lots, AV service facilities) traversed by the fleet of AVs 110. The map database 620 includes data describing roadways (e.g., locations of roadways, connections between roadways, roadway names, speed limits, traffic flow regulations, toll information, etc.), data describing buildings (e.g., locations of buildings, building geometry, building types), and data describing other objects (e.g., location, geometry, object type), and data describing other features, such as bike lanes, sidewalks, crosswalks, traffic lights, parking lots, etc. At least a portion of the data stored in the map database 620 is provided to the AVs 110 as a map database 510, described above.

The user database 630 stores data describing users of the fleet of AVs 110. Users may create accounts with the fleet management system 120, which stores user information associated with the user accounts in the user database 630. The user information may include identifying information (name, user name), password, payment information, home address, contact information (e.g., email and telephone number), and information for verifying the user (e.g., photograph, driver's license number). Users may provide some or all of the user information to the fleet management system

120. In some embodiments, the fleet management system 120 may infer some user information from usage data or obtain user information from other sources, such as public databases or licensed data sources.

The fleet management system 120 may learn one or more home addresses for a user based on various data sources and user interactions. The user may provide a home address when setting up his account, e.g., the user may input a home address, or the user may provide an address in conjunction with credit card information. In some cases, the user may have more than one home, or the user may not provide a home address, or the user-provided home address may not be correct (e.g., if the user moves and the home address is out of date, or if the user's address associated with the credit card information is not the user's home address). In such cases, the fleet management system 120 may obtain a home address from one or more alternate sources. In one example, the fleet management system 120 obtains an address associated with an official record related to a user, such as a record from a state licensing agency (e.g., an address on the user's driver's license), an address from the postal service, an address associated with a phone record, or other publicly available or licensed records. In another example, the fleet management system 120 infers a home address based on the user's use of a service provided by the fleet management system 120. For example, the fleet management system 120 identifies an address associated with at least a threshold number of previous rides provided to a user (e.g., at least 10 rides, at least 50% of rides, or a plurality of rides), or at least a threshold number of previous deliveries (e.g., at least five deliveries, at least 60% of deliveries) as a home address or candidate home address. The fleet management system 120 may look up a candidate home address in the map database 620 to determine if the candidate home address is associated with a residential building type, e.g., a single-family home, a condominium, or an apartment. The fleet management system 120 stores the identified home address in the user database 630. The fleet management system 120 may obtain or identify multiple addresses for a user and associate each address with the user in the user database 630. In some embodiments, the fleet management system 120 identifies a current home address from multiple candidate home addresses, e.g., the most recent address, or an address that the user rides to or from most frequently and flags the identified current home address in the user database 630.

The vehicle manager 640 directs the movements of the AVs 110 in the fleet. The vehicle manager 640 receives service requests from users from the UI server 610, and the vehicle manager 640 assigns service requests to individual AVs 110. For example, in response to a user request for transportation from an origin location to a destination location, the vehicle manager 640 selects an AV and instructs the AV to drive to the origin location (e.g., a passenger or delivery pickup location), and then instructs the AV to drive to the destination location (e.g., the passenger or delivery destination location). In addition, the vehicle manager 640 may instruct AVs 110 to drive to other locations while not servicing a user, e.g., to improve geographic distribution of the fleet, to anticipate demand at particular locations, to drive to a charging station for charging, etc. The vehicle manager 640 also instructs AVs 110 to return to AV facilities for recharging, maintenance, or storage.

The grocery delivery manager 650 manages various aspects of grocery delivery services performed by an AV, including but not limited to determining a delivery route based on the deliveries to be made by an AV and tracking completion of each of the scheduled deliveries.

Example Methods for Transparent Cubby System Implementation and Operation

Figure 7:
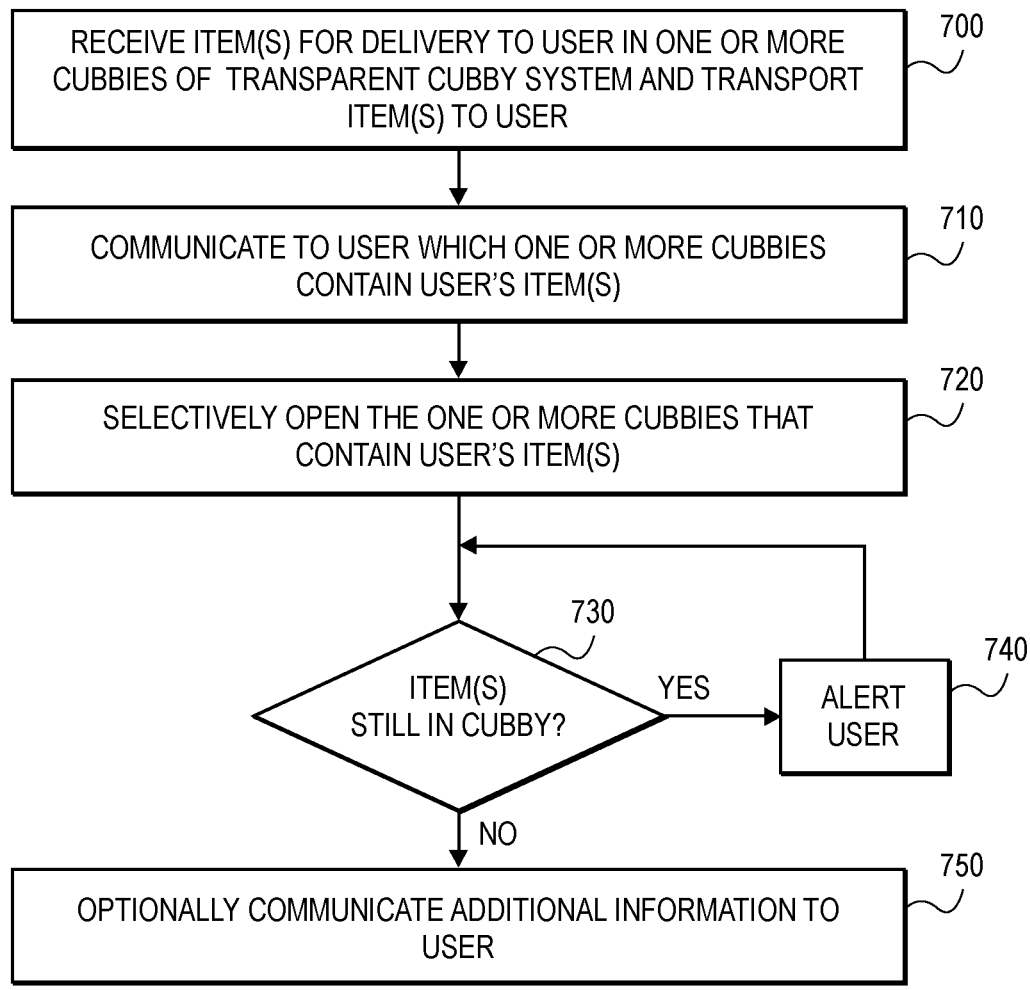
FIG. 7 is a flowchart of an example process for implementing and operating a transparent cubby system in an AV according to some embodiments of the present disclosure.

FIG. 7 is a flowchart illustrating an example process for implementing and operating a transparent cubby system in an AV delivery service according to some embodiments of the present disclosure. One or more of the steps illustrated in FIG. 7 may be executed by one or more of the elements shown in FIGS. 5 and 6.

In step 700, one or more items for delivery to one or more users are received in one or more cubbies of the transparent cubby system described herein for delivery to the user(s) according to a determined route. In certain embodiments, the items are loaded into the various cubbies in accordance with instructions provided to the loader. In other embodiments, the loader indicates to the system in what cubbies the various items are loaded. In yet other embodiments, the cubbies are equipped with sensors for identifying (e.g., by user/recipient) what items are loaded therein. Such sensors may include readers (e.g., RFID tag readers, bar code readers, QR code readers) for detecting tags or codes applied to an item loaded into the cubby.

As previously noted, each of the cubbies may be temperature controlled. Such temperature control may be static, such that each cubby constantly maintains a certain temperature, in which case items may be loaded into select cubbies based on temperature requirements of the item. Alternatively, such temperature control may be dynamic, such that the temperature of each cubby may be changed, in which case the temperature of the cubby may be manually or automatically set based on the item loaded therein.

In step 710, prior to and/or contemporaneously with arrival at a delivery destination, the system communicates to a user the cubby or cubbies in which their items are contained. For example, the location(s) of the user's items within the transparent cubby system may be communicated via an app on the user's mobile device. Additionally and/or alternatively, the location(s) of the user's items within the transparent cubby system may be communicated via the transparent touchscreen displays integrated into doors of the cubbies of the system. For example, the displays may be rendered transparent or opaque, text messages may be displayed thereon, graphics (e.g., an arrow or star) may be displayed thereon, the screen may be made to blink or flash, and/or may display a color. It will be recognized that the manner in which the display conveys information to the user may be configurable by the user via the user interface.

In step 720, once the user's attention has been drawn to the cubby or cubbies in which their item or items are stowed, the user may be prompted to authenticate their identity. For example, the user may be prompted to enter a passcode using a keypad presented on the display(s) corresponding the cubby/cubbies in which their items are stowed. Alternatively the user may be promoted to enter a passcode on the user's mobile device. Still further, the user may be prompted to enter a passcode via a device installed on a common area of transparent cubby system and common to all of the cubbies. The passcode may be one that has been previously selected by the user for the delivery system or may have been provided to the user for one time use in connection with the order. Once the user's identity has been authenticated, the cubby or cubbies in which the user's items are stored are opened, allowing the user to remove their item(s).

In step 730, a determination is made whether there is still an item remaining in one of the cubbies designated as containing the user's item(s). If so, execution proceeds to step 740; otherwise, execution proceeds to optional step 750.

In step 740, the user is alerted to the fact that they have left an item in one of the cubbies. For example, a visual alert may be provided to the user via the display integrated into the door and/or via the user interface of the app installed on the user's mobile device. Alternatively, the system could prevent the user from manually shutting the door to the cubby in which an item remains. In some embodiments, the transparent cubby system may be configured such that the cubby doors automatically and only close after all of the items have been removed from the cubby or cubbies such that a cubby door remaining open will alert the user to the fact that an item remains inside the open cubby. Other types of user alerts may include illuminating the interior of the cubby in which an item remains and/or flashing or blinking lights within the cubby or using the integrated door display.

In optional step 750, additional information may be communicated to the user via the transparent cubby system. For example, a message may be displayed across multiple ones of the displays of the transparent cubby display system thanking the user for using the service or displaying a graphic of, for example, a trademark of the provider of the items delivered to the user.

Select Examples

Example 1 provides an autonomous delivery system for a vehicle including a plurality of cubbies for retaining items for delivery to users, wherein each of the cubbies comprises a door for selectively enabling access to contents of the cubby, wherein each of the doors comprises a selectively transparent display and wherein upon arrival at a delivery destination, the selectively transparent displays communicate to a recipient associated with the delivery destination in which one of the cubbies a delivery associated with the recipient is retained; and an authentication system for authenticating the recipient and, subsequent to successful authentication of the recipient, permitting access to contents of the one of the cubbies in which the delivery associated with the recipient is retained.

In Example 2, the system of Example 1 may further include the display of the one of the cubbies in which the delivery associated with the recipient is retained being rendered transparent and the displays of the remaining ones of the cubbies are rendered opaque.

In Example 3, the system of any of Examples 1-2 may further include the display of the one of the cubbies in which the delivery associated with the recipient is retained being rendered a first color and the displays of the remaining ones of the cubbies are rendered a second color.

In Example 4, the system of any of Examples 1-3 may further include each of the cubbies further comprising lighting interior to the cubby, wherein the lighting interior to the one of the cubbies in which the delivery associated with the recipient is retained is in an on state and the lighting interior to the remaining cubbies is in an off state.

In Example 5, the system of any of Examples 1-4 may further include each of the displays being a touchscreen and the authentication system including a keypad selectively displayed on the display of the one of the cubbies in which the delivery associated with the recipient is retained.

In Example 6, the system of any of Examples 1-5 may further include the authentication system comprising a keypad selectively displayed on a user device of the recipient.

In Example 7, the system of any of Examples 1-6 may further include an indication of the one of the cubbies in which the delivery associated with the recipient is retained being displayed on a user device of the recipient.

In Example 8, the system of any of Examples 1-7 may further include a text message for notifying the recipient being displayed on the display of the one of the cubbies in which the delivery associated with the recipient is retained.

In Example 9, the system of any of Examples 1-8 may further include graphics for notifying the recipient being displayed on the display of the one of the cubbies in which the delivery associated with the recipient is retained.

In Example 10, the system of any of Examples 1-9 may further include a system for detecting whether the delivery has been removed from the one of the cubbies and if not, alerting the recipient to remove the delivery.

Example 11 provides an autonomous delivery system including a plurality of cubbies disposed within an autonomous vehicle (AV), the cubbies for retaining items for delivery to users, wherein each of the cubbies comprises a door for selectively enabling access to contents of the cubby, wherein each of the doors comprises a transparent touchscreen display; a system for using the displays to communicate to a recipient associated with the delivery destination in which one of the cubbies a delivery associated with the recipient is retained; and an authentication system for authenticating the recipient and, subsequent to successful authentication of the recipient, opening the door of the one of the cubbies in which the delivery associated with the recipient is retained, wherein the authentication system comprises a keypad selectively displayed on the display of the one of the cubbies in which the delivery associated with the recipient is retained for use by the recipient to enter a passcode.

In Example 12, the system of Example 11 may further include the system for using the displays to communicate to the recipient including at least one of rendering the display of the one of the cubbies in which the delivery associated with the recipient is retained transparent and rendering the displays of the remaining ones of the cubbies opaque; rendering the display of the one of the cubbies in which the delivery associated with the recipient is retained a first color and rendering the displays of the remaining ones of the cubbies a second color; displaying a text message intended for the recipient on the display of the one of the cubbies in which the delivery associated with the recipient is retained; and displaying graphics intended for the recipient on the display of the one of the cubbies in which the delivery associated with the recipient is retained.

In Example 13, the system of any of Examples 11-12 may further include a mechanism for detecting whether the delivery has been removed from the one of the cubbies and if not, alerting the recipient to remove the delivery.

Example 14 provides an autonomous delivery system method including receiving in one of a plurality of cubbies arranged in an autonomous vehicle (AV) an item for transportation to a recipient at a delivery destination, wherein each of the cubbies includes a door for selectively enabling access to contents of the cubby, wherein each of the doors comprises a selectively transparent display; navigating the AV to the delivery destination; subsequent to arrival at the delivery destination, identifying to the recipient using the selectively transparent displays the one of the cubbies in which the delivery is located; authenticating the recipient using a passcode provided by the recipient; and subsequent to successful authentication of the recipient, permitting access to the delivery via the door of the one of the cubbies.

In Example 15, the method of Example 14 may further include rendering the display of the one of the cubbies transparent and rendering the displays of the remaining ones of the cubbies opaque.

In Example 16, the method of any of Examples 14-15 may further include rendering the display of the one of the cubbies a first color and rendering the displays of the remaining ones of the cubbies a second color.

In Example 17, the method of any of Examples 14-16 may further include illuminating an interior of the one of the cubbies.

In Example 18, the method of any of Examples 14-17 may further include each of the displays including a touchscreen and wherein the authenticating the recipient further comprises displaying a keypad on the display of the one of the cubbies.

In Example 19, the method of any of Examples 14-18 may further include detecting that the delivery has not been removed from the one of the cubbies.

In Example 20, the method of any of Examples 14-19 may further include alerting the recipient that the delivery has not been removed from the one of the cubbies.

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the FIGS. may be combined in various possible configurations, all of which are clearly within the broad scope of this Specification.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. An autonomous delivery system for a vehicle comprising:
   a plurality of cubbies for retaining items for delivery to users, wherein each of the cubbies comprises a door for selectively enabling access to contents of the cubby, wherein each of the doors comprises a selectively transparent display and wherein upon arrival at a delivery destination, the selectively transparent displays communicate to a recipient associated with the delivery destination in which one of the cubbies a delivery associated with the recipient is retained; and
   an authentication system for authenticating the recipient and, subsequent to successful authentication of the recipient, permitting access to contents of the one of the cubbies in which the delivery associated with the recipient is retained.

2. The autonomous delivery system of claim 1, wherein the display of the one of the cubbies in which the delivery associated with the recipient is retained is rendered transparent and the displays of the remaining ones of the cubbies are rendered opaque.

3. The autonomous delivery system of claim 1, wherein the display of the one of the cubbies in which the delivery associated with the recipient is retained is rendered a first color and the displays of the remaining ones of the cubbies are rendered a second color.

4. The autonomous delivery system of claim 1, wherein each of the cubbies further comprises lighting interior to the cubby, wherein the lighting interior to the one of the cubbies in which the delivery associated with the recipient is retained is in an on state and the lighting interior to the remaining cubbies is in an off state.

5. The autonomous delivery system of claim 1, wherein each of the displays is a touchscreen and the authentication system comprises a keypad selectively displayed on the display of the one of the cubbies in which the delivery associated with the recipient is retained.

6. The autonomous delivery system of claim 1, wherein the authentication system comprises a keypad selectively displayed on a user device of the recipient.

7. The autonomous delivery system of claim 1, wherein an indication of the one of the cubbies in which the delivery associated with the recipient is retained is displayed on a user device of the recipient.

8. The autonomous delivery system of claim 1, wherein a text message for notifying the recipient is displayed on the display of the one of the cubbies in which the delivery associated with the recipient is retained.

9. The autonomous delivery system of claim 1, wherein graphics for notifying the recipient is displayed on the display of the one of the cubbies in which the delivery associated with the recipient is retained.

10. The autonomous delivery system of claim 1 further comprising a system for detecting whether the delivery has been removed from the one of the cubbies and if not, alerting the recipient to remove the delivery.

11. An autonomous delivery system comprising:
   a plurality of cubbies disposed within an autonomous vehicle (AV), the cubbies for retaining items for delivery to users, wherein each of the cubbies comprises a door for selectively enabling access to contents of the cubby, wherein each of the doors comprises a transparent touchscreen display;
   a system for using the displays to communicate to a recipient associated with the delivery destination in which one of the cubbies a delivery associated with the recipient is retained; and
   an authentication system for authenticating the recipient and, subsequent to successful authentication of the recipient, opening the door of the one of the cubbies in which the delivery associated with the recipient is retained, wherein the authentication system comprises a keypad selectively displayed on the display of the one of the cubbies in which the delivery associated with the recipient is retained for use by the recipient to enter a passcode.

12. The autonomous delivery system of claim 11, wherein the system for using the displays to communicate to the recipient comprises at least one of:
   rendering the display of the one of the cubbies in which the delivery associated with the recipient is retained transparent and rendering the displays of the remaining ones of the cubbies opaque;
   rendering the display of the one of the cubbies in which the delivery associated with the recipient is retained a first color and rendering the displays of the remaining ones of the cubbies a second color;
   displaying a text message intended for the recipient on the display of the one of the cubbies in which the delivery associated with the recipient is retained; and
   displaying graphics intended for the recipient on the display of the one of the cubbies in which the delivery associated with the recipient is retained.

13. The autonomous delivery system of claim 11 further comprising a mechanism for detecting whether the delivery has been removed from the one of the cubbies and if not, alerting the recipient to remove the delivery.

14. An autonomous delivery system method comprising:
   receiving in one of a plurality of cubbies arranged in an autonomous vehicle (AV) an item for transportation to a recipient at a delivery destination, wherein each of the cubbies includes a door for selectively enabling access to contents of the cubby, wherein each of the doors comprises a selectively transparent display;
   navigating the AV to the delivery destination;
   subsequent to arrival at the delivery destination, identifying to the recipient using the selectively transparent displays the one of the cubbies in which the delivery is located;
   authenticating the recipient using a passcode provided by the recipient; and
   subsequent to successful authentication of the recipient, permitting access to the delivery via the door of the one of the cubbies.

15. The method of claim 14 further comprising rendering the display of the one of the cubbies transparent and rendering the displays of the remaining ones of the cubbies opaque.

16. The method of claim 14 further comprising rendering the display of the one of the cubbies a first color and rendering the displays of the remaining ones of the cubbies a second color.

17. The method of claim 14 further comprising illuminating an interior of the one of the cubbies.

18. The method of claim 14, wherein each of the displays comprises a touchscreen and wherein the authenticating the recipient further comprises displaying a keypad on the display of the one of the cubbies.

19. The method of claim 14 further comprising detecting that the delivery has not been removed from the one of the cubbies.

20. The method of claim 19 further comprising alerting the recipient that the delivery has not been removed from the one of the cubbies.

* * * * *